United States Patent [19]
Nagaoka

[11] Patent Number: 5,673,726
[45] Date of Patent: Oct. 7, 1997

[54] METHOD FOR WEAVING A MULTI-PLY FABRIC PACKING WITH HEXAGONAL CELLS

[75] Inventor: Tadayoshi Nagaoka, Mihara-machi, Japan

[73] Assignee: Nagaoka International Corporation, Japan

[21] Appl. No.: 489,007

[22] Filed: Jun. 8, 1995

Related U.S. Application Data

[63] Continuation of Ser. No. 186,233, Jan. 25, 1994, abandoned, which is a continuation-in-part of Ser. No. 952,603, Sep. 28, 1992, abandoned.

[30] Foreign Application Priority Data

Jan. 10, 1991 [JP] Japan .................. 3-280548

[51] Int. Cl.⁶ ................................... D03D 11/02
[52] U.S. Cl. ................ 139/11; 139/384 R; 428/118
[58] Field of Search .................. 139/409, 11, 384 R; 428/118; 261/111, 114.1

[56] References Cited

U.S. PATENT DOCUMENTS

| | | | |
|---|---|---|---|
| 3,102,559 | 9/1963 | Koppelman et al. | 139/384 R |
| 3,228,426 | 1/1966 | Bilsky | 139/410 X |
| 3,943,980 | 3/1976 | Rheaume | 139/384 R |
| 4,117,049 | 9/1978 | Carrico. | |
| 4,701,287 | 10/1987 | Manteufel. | |

FOREIGN PATENT DOCUMENTS

| | | | |
|---|---|---|---|
| 0286004 | 10/1988 | European Pat. Off.. | |
| 2599484 | 12/1987 | France. | |
| 2-191740 | 7/1990 | Japan | 139/384 R |
| 447067 | 3/1968 | Switzerland. | |
| 607290 | 8/1948 | United Kingdom. | |

Primary Examiner—Andy Falik
Attorney, Agent, or Firm—Hedman, Gibson & Costigan, P.C.

[57] ABSTRACT

A method for manufacturing a woven packing used in a device having an internal structure divided in a plurality of chambers or channels connected to one another for realizing material transfer, heat exchange or fixing between gases, liquids or gas and liquid is disclosed. The packing forming the internal structure has undulating permeable sheets disposed in parallel to one another to form plural channels which extend substantially in the direction of a main stream of fluid, said sheets having projecting portions which are disposed in a direction crossing the direction of the main stream and joints being formed between adjacent permeable sheets in the projecting portions. The joints between the adjacent permeable sheets are formed by simultaneously weaving a plurality of channels to manufacture a woven packing.

6 Claims, 10 Drawing Sheets

METHOD FOR WEAVING A MULTI-PLY FABRIC PACKING WITH HEXAGONAL CELLS

This is a continuing application of Ser. No. 08/186,233 Jan. 25, 1994, now abandoned which is a continuation-in-part of Ser. No. 07/952,603 Sep. 28, 1992, now abandoned.

BACKGROUND OF THE INVENTION

This invention relates to a method for manufacturing a packing having a plurality of channels for fluid, which allows material transfer, heat exchange or mixing between gases, liquids or gas and liquid.

Japanese Patent Application No. 203976/1991 discloses a packing consisting of a plurality of permeable sheets which are disposed in parallel to one another and extend in the direction of a main steam of fluid. Projecting portions of these permeable sheets are disposed in the direction that crosses the main stream of fluid and these projections function as spacers between the adjacent permeable sheets. This packing (hereinafter referred to as "X-packing" because the cross section of a joint portion between two adjacent permeable sheets assumes the shape of the letter X) is beneficial in that fluid flowing down along the permeable sheets is repeatedly joined, mixed, horizontally dispersed and redistributed at each joint of the permeable sheets. Thus, fluid flow which was not uniform when it was charged in the device gradually becomes uniform resulting in an optimum material transfer or heat exchange. Moreover, gas charged in the device passes through the liquid flowing along the inclined surfaces of the permeable sheets and necessary contact between the gas and the liquid is achieved by contacting the gas with the liquid while the gas passes through the permeable sheets, so that material transfer or heat exchange can be effected efficiently with a minimum pressure loss.

Figure 9:
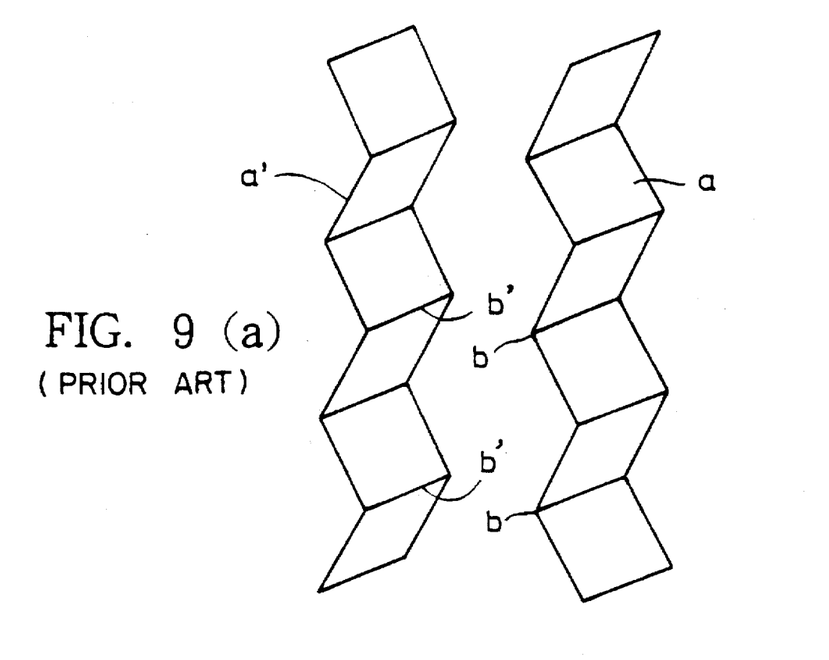

For manufacturing the X-packing, a method which has been carried out in the past employs undulating permeable sheets, as shown in FIG. 9(a), which are formed by bending sheets of wiremesh, plastic meshed sheets, cotton cloth or the like permeable material alternately at a certain pitch. According to this method, projecting portions b, b' of adjacent permeable sheets a, a' are joined together by welding (in the case of wire-mesh), bonding (in the case of plastic sheet) or sewing (in the case of cotton cloth) to form an X-packing as shown in FIG. 9(b).

Figure 10:
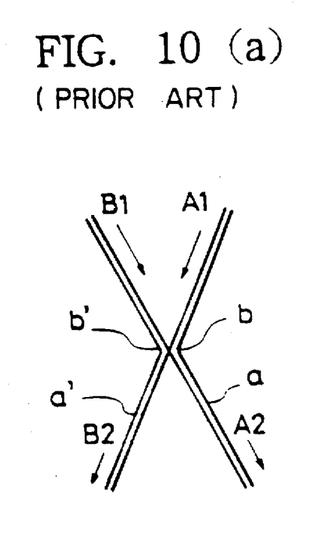

The prior art method for manufacturing an X-packing includes a troublesome step of joining the projections b, b' of the adjacent permeable sheets, a, a' manually by welding etc. The prior art method also has an additional disadvantage in that the dispersion of liquid becomes uneven except when the projecting portions b, b' of the permeable sheets a, a' are in complete line contact with each other as shown in FIG. 10(a). That is, when there is offset in the contact between the projecting portions b, b' as shown in FIGS. 10(b) and 10(c), a larger volume of liquid tends to flow to a permeable sheet whose point of contact with the adjacent permeable sheet is lower. In the case of FIG. 10(b), for example, equal liquid flows A1 and B1 are redistributed after the joint of the projections b, b' to a flow B2 of a larger volume along the permeable sheet a' and a flow A2 of a smaller volume along the permeable sheet a. Conversely, in the case of FIG. 10(c), equal flows A1 and B1 are re-distributed to a flow A2 of a larger volume along the permeable sheet of a and a flow B2 of a smaller volume along the permeable sheet a'. The line contact at the projecting portions b, b' shown in FIG. 10(a) is ideal but it is very difficult to realize this ideal line contact. During the actual joining work of projecting portions b, b', the actual joints obtained tend to become the offset joints shown in FIGS. 10(b) and 10(c).

For preventing the above described deviation in the distribution of liquid, it is conceivable to join, by welding, bonding or sewing, a belt-like sheet of a single layer or plural layers made of a non-permeable or less permeable material to both sides of the joint or between the projecting portions to hold liquid flowing from above and to distribute it to the respective permeable sheets located below as uniformly as possible. It is extremely difficult to form joints of a uniform width and thickness by manually welding, bonding or sewing such belt-like sheets on both sides of or between a multiplicity of joints. This difficulty prevents mass production of the X-packing and increases manufacturing cost of the X-packing.

It is, therefore, an object of the present invention to provide a method for manufacturing, at a low cost and in a large scale, an X-packing in which aggregation, horizontal dispersion and downward redistribution of liquid at joints of projecting portions of respective permeable sheets can be made uniform.

SUMMARY OF THE INVENTION

For achieving the above described object of the invention, there is provided a method for manufacturing a packing used in a device having an internal structure divided into a plurality of chambers or channels, connected to one another for realizing material transfer, heat exchange or mixing between gases, liquids or gas and liquid. The packing forms said internal structure and includes undulating permeable sheets disposed in parallel to one another to form plural channels extending substantially in the direction of a main stream of fluid. The projecting portions of respective undulating permeable sheets being disposed in a direction substantially crossing the direction of the main stream and joints being formed between adjacent permeable sheets in the projecting portions. The method of the invention provides a packing having undulating permeable sheets of plural channels with the joints between the adjacent permeable sheets being formed by simultaneously weaving respective channels thereby to manufacture a woven packing having plural channels.

More specifically, the method according to the invention comprises the following steps:

(a) weaving a joint between a first permeable sheet and a second permeable sheet adjacent to the first permeable sheet among the permeable sheets forming said packing, and weaving a joint between a third permeable sheet adjacent to the second permeable sheet on the opposite side of the first permeable sheet and a fourth permeable sheet adjacent to the third permeable sheet on opposite side to the second permeable sheet, (b) weaving portions other than the joints of the respective permeable sheets, (c) weaving a joint between the second permeable sheet and the third permeable sheet, and (d) weaving portions other than the joints of the respective permeable sheets.

According to the invention, joints and portions other than joints of permeable sheets of respective channels are woven one after another and a woven packing having plural channels is provided automatically. Since the packing is manufactured by a continuous operation of a mechanical weaving process based on a predetermined weaving pattern, the manufactured packing has a multiplicity of regularly arranged, closed rhombic chambers of the same size consisting of permeable sheets of uniform meshes in which the joints are formed in a uniform thickness and uniform length due to the uniform weaving process.

Further, according to the method of the invention, manual work such as welding, bonding or sewing is obviated and, therefore, a large scale production of the X-packing is made feasible and the manufacturing cost is remarkably reduced.

The method according to the present invention is most suitably applied to manufacture of the X-packing. The invention is applicable also to the manufacture of multi-stratum structure such as a mist eliminator, multi-stratum filter membrane, multi-stratum cloth and aggregate.

A preferred embodiment of the method according to the invention will be described below with reference to the accompanying drawings.

BRIEF DESCRIPTION OF THE DRAWINGS

In the accompanying drawings

FIGS. 3(a–b) is a diagram showing the relationship between operation of the heddle group and weaving of permeable sheets and joints;

FIGS. 4(a–b) is a diagram showing a state of weaving of portions other than joints by operation of the heddle group;

FIGS. 5(a–b) is a diagram showing a state of weaving of other joints by operation of the heddle group;

FIGS. 9(a–b) is a diagram showing a prior art method for manufacturing an X-packing; and FIGS. 10(a), 10(b) and 10(c) are diagrams showing a prior art method for manufacturing an X-packing in which FIG. 10(a) shows a state of projections b and b' being in complete line contact with each other and FIGS. 10(b) and 10(c) show states where b and b' are offset from the line contact state.

DESCRIPTION OF PREFERRED EMBODIMENTS

Figure 1:
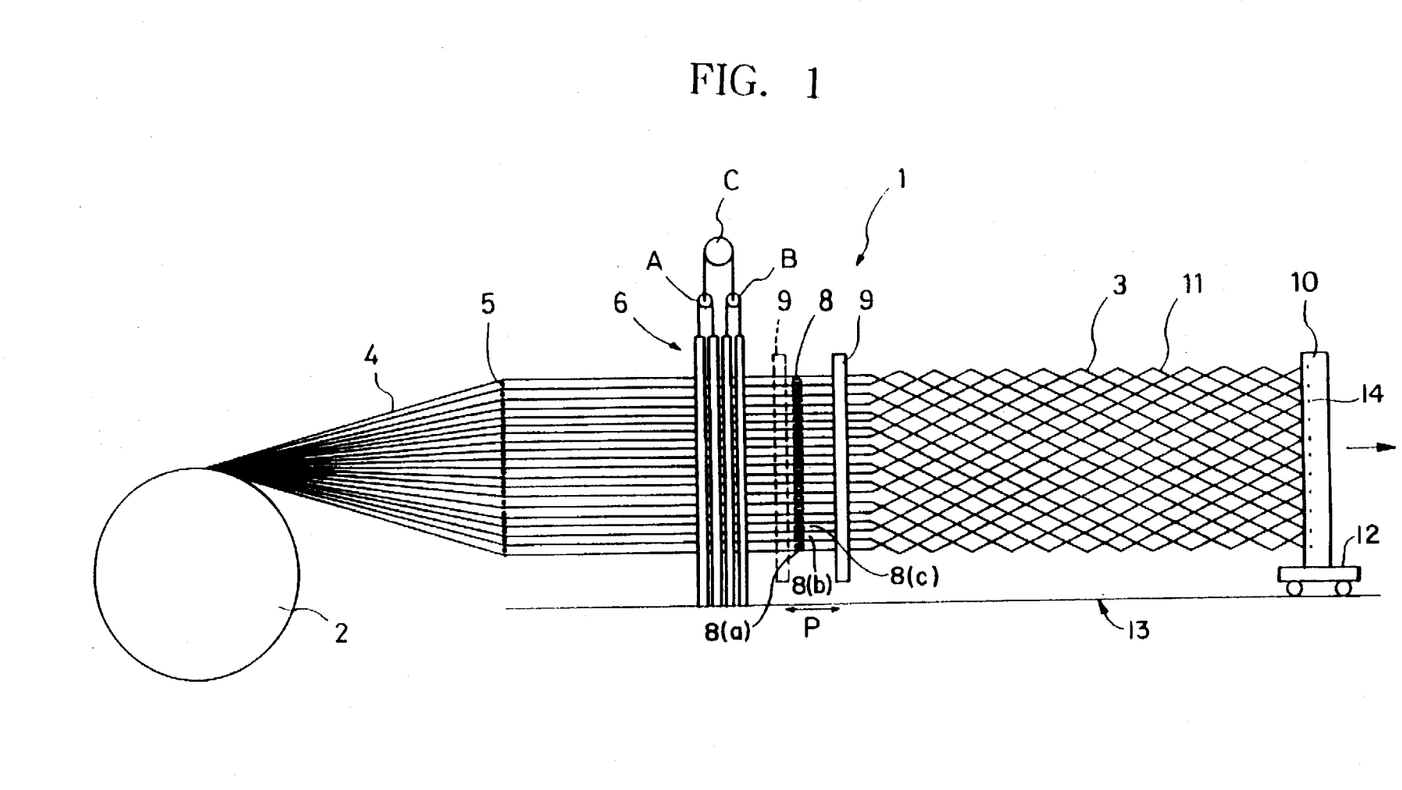
FIG. 1 is a side view of a loom used in an embodiment of the invention.

Referring first to FIG. 1, warps used for weaving permeable sheets 11 in plural strata of a packing 3 are wound on a warper 2 of a loom 1. These warps 4 are sorted in plural strata through a back rest 5 and then supplied to a heddle group 6 having a plurality of heddles.

Figure 2:
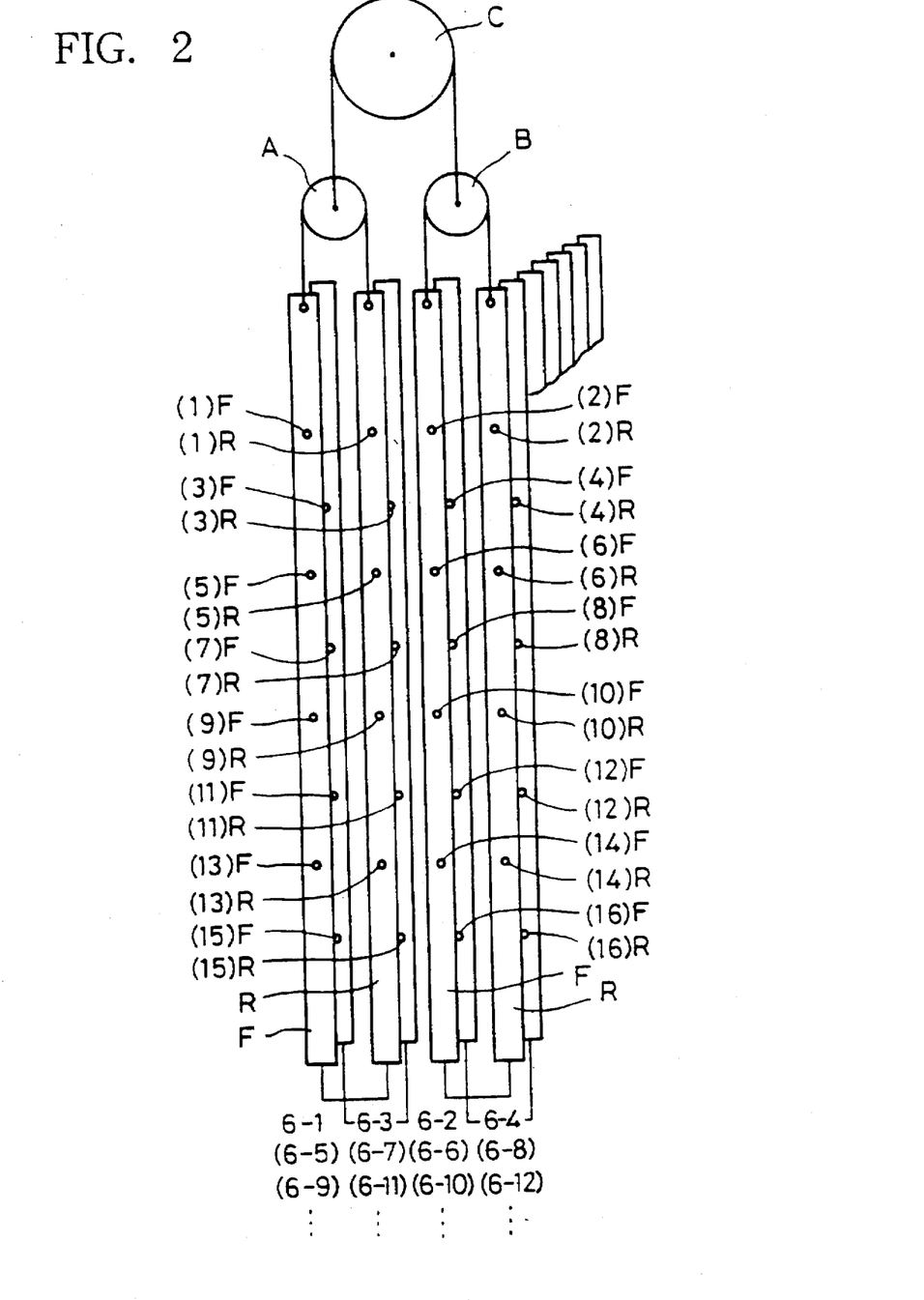
FIG. 2 is a schematic diagram showing a heddle group used in the embodiment.

The heddle group 6 includes, as shown in FIG. 2, heddles in sets of a necessary number corresponding to the width of the packing 3 to be woven. In FIG. 2, heddles 6-1, 6-2, 6-3 and 6-4 perform four types of movements by rotation of pulleys A, B and C to constitute one set of heddles. Likewise, heddles 6-5, 6-6, 6-7 and 6-8 constitute another set and heddles 6-9, 6-10, 6-11 and 6-12 constitute still another set. The heddle group 6 is disposed in parallel in the direction of the width of the packing 3. The heddles 6-1, 6-2, 6-3 and 6-4 consist respectively of a pair of front and rear heddles 6-1F, 6-1R, 6-2F, 6-2R etc. The pair of heddles 6-1F and 6-1R (or 6-3F and 6-3R etc.) are suspended from the pulley A in such a manner that when one of the front and rear heddles rises, the other will fall. Likewise, the pair of heddles 6-2F and 6-2R (6-4F, 6-4R etc.) are suspended from the pulley B in such a manner that one of the front and rear heddles rises, the other falls. The pulleys A and B in turn are suspended from the pulley C in such a manner that when one of the pulleys A and B rises, the other will fall. Each of the heddles is formed with eyes (1)F, (1)R etc. for passing warps therethrough in plural stages corresponding in number to the number of layers of the permeable sheets 11 (for convenience of description, only four eyes are shown in each heddle). Eyes (3)F, (3)R etc. of the heddle 6-3 are formed in locations offset downwardly by a half pitch from the eyes (1)F, (1)R etc. of the heddle 6-1. The same arrangement is made about the location of the eyes with respect to the other heddles. For simplicity, only heddles 6-1, 6-2, 6-3 and 6-4 are shown in FIG. 2. In practice, more heddles than shown in FIG. 2 may be present to correspond to the width of the packing to be woven. Operation of the heddle group 6 will be described later.

The warps 4 passing through the eyes of the heddles of the heddle group 6 are then supplied to a multi-stage shuttle 8. The multi-stage shuttle 8 is a shuttle having stages 8(a), 8(b), 8(c) etc. corresponding to the number of layers of the permeable sheets 11 forming the packing 3 and it feeds wefts for weaving of non-joint portions 11a and joints 11b (see FIG. 8) of each permeable sheet 11.

In a preferred embodiment, as shown in FIG. 1, the individual stages 8(a), 8(b) etc. of the multistage shuttle extend horizontally from a vertically oriented base of the multistage shuttle 8. The horizontally oriented individual stages 8(a), 8(b) etc. are parallel to each other and stacked in a vertical arrangement, i.e. stage 8(c) extends horizontally from the multistage shuttle base and is above stage 8(b), stage 8(b) extends horizontally from the multistage shuttle base and is above stage 8(a). The vertically oriented base functions to move the stages into position for picking the wefts and does not move across the warp sheds.

A reed 9 is of a comb-shape having plural grooves through which the warps pass and the warps of the plural strata which form the permeable sheet 11 pass in plural stages through the same groove. In weaving the non-joint portions 11a and the joints 11b of each permeable sheet 11, wefts are fed by the shuttle 8 and thereafter the reed 9 is reciprocated in the direction of arrow P in FIG. 1 to press the weft in the horizontal direction. As a result, the non-joint portions 11a and the joints 11b of the permeable sheets of the respective layers are simultaneously and continuously woven.

In the present embodiment, the foremost end of the packing 3 is held by a holder 10. By moving the holder 10 away from the loom 1, the permeable sheets 11 in the plural strata are moved horizontally.

In a preferred embodiment, the holder is mounted on a movable table 12. Table 12 in turn is mounted on a track or rail system 13 that is part of the loom 1. The table 12 may be moved towards the loom 1 or away from the loom 1 in order to keep the necessary tension on the woven fabric.

In an alternative preferred embodiment, the loom 1 may be mounted on a movable table and the holder 10 mounted in a stationary position. In this alternative embodiment, the loom 1 can be moved towards the stationary holder 10 or away from the stationary holder 10 on a track or rail system to maintain the necessary tension on the woven fabric.

As shown in FIG. 1, the fabric is attached to a series of horizontally oriented bars (14) that are attached to the holder 10 in a vertical arrangement.

When the warps are fixed to holder 10 as shown in the drawing, the warps for the top and bottom layers are longer than the warps of the middle layer. This operational step is implicit in the provision that the shuttle 8 have sufficient space to produce the woven article and the proper tension is maintained on the undulating layers.

Figure 3:
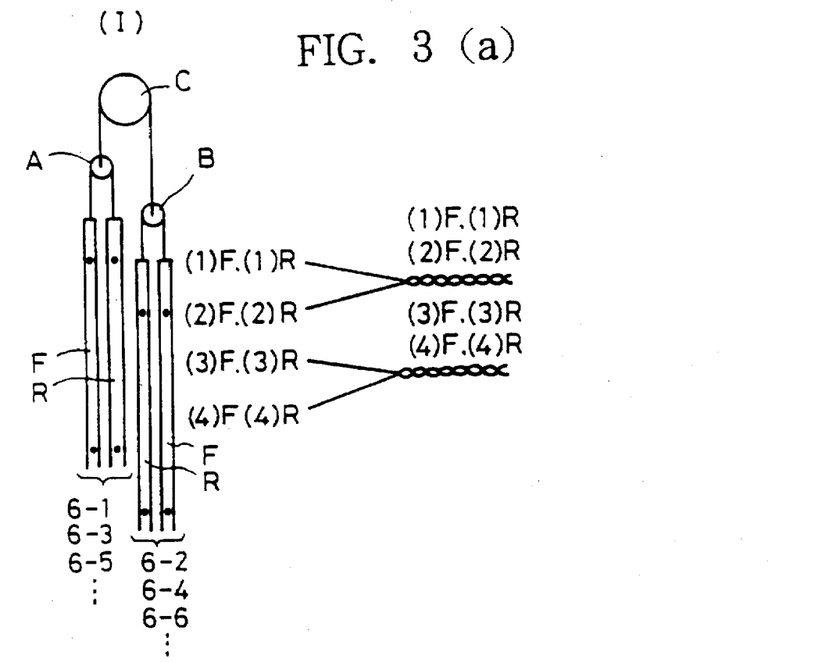
Figure 4:
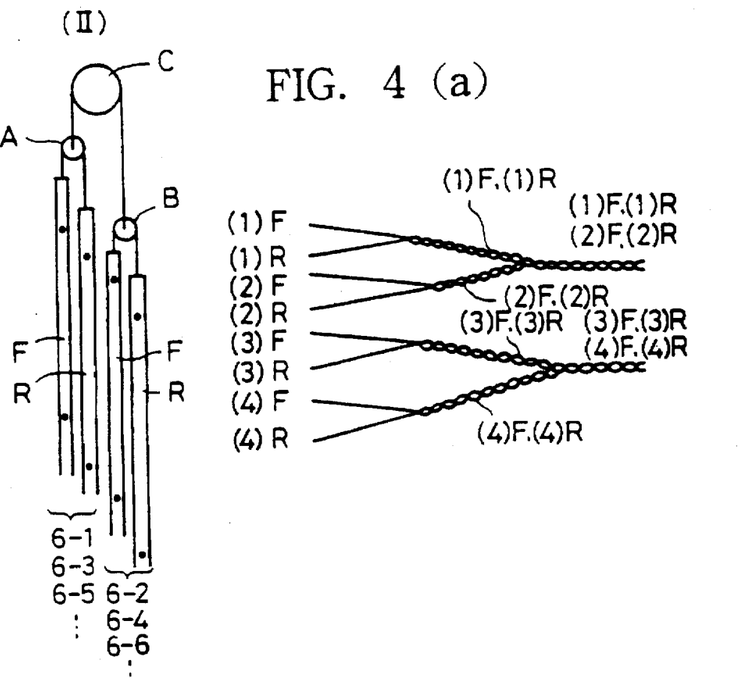
Figure 5:
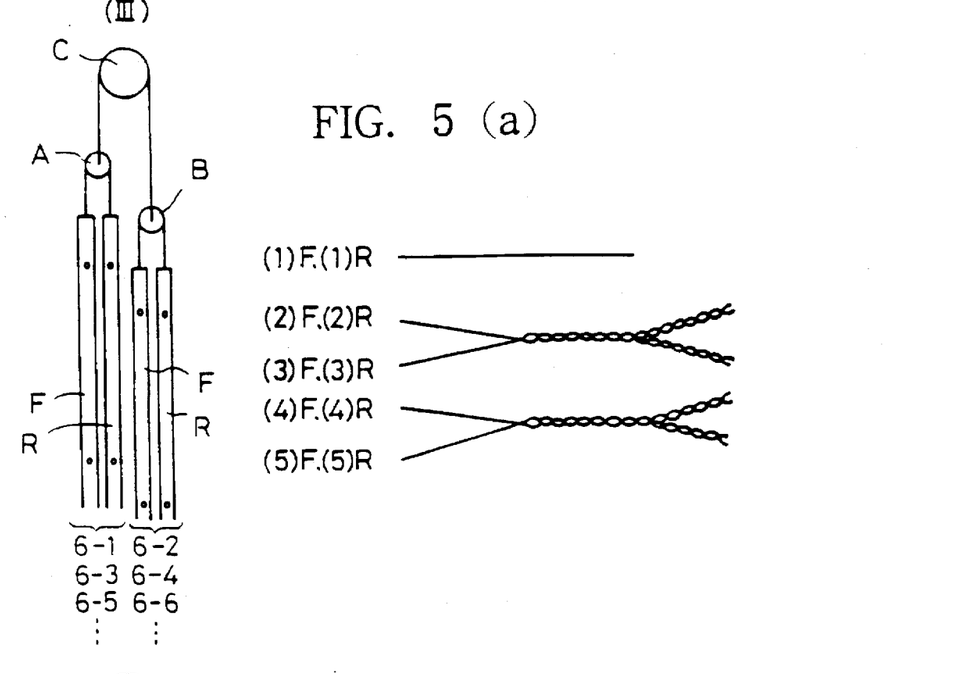

Referring now mainly to FIGS. 3 to 5, the relationship between the operation of the heddle group 6 and the woven states during weaving of the non-joint portions 11a and the joints 11b of the permeable sheets 11 will be described.

Step (I)

In step (I) shown in FIG. 3, joints between respective adjacent permeable sheets such as a joint between a permeable sheet (1) of the first layer (the uppermost layer) and a permeable sheet (2) of the second layer, a joint between a permeable sheet (3) of the third layer, and a permeable sheet (4) of the fourth layer, a joint between a permeable sheet (5) of the fifth layer and a permeable sheet (6) of the sixth layer are woven.

In FIG. 3 the pulleys A and B are not rotated but only pulley C is rotated by a predetermined angle alternately in opposite direction. In the state shown in FIG. 3(a), the pulley A is in a lifted position and the pulley B is in a lowered position, so that the heddles 6-1, 6-3, 6-5 etc. are in a lifted position and the heddles 6-2, 6-4, 6-6 etc. are in a lowered position. Each pair of heddles (6-1F and 6-1R etc.) are on the same level. Accordingly, warps (1)F and (1)R for weaving the permeable sheet (1) are in a higher position than the warps (2)F and (2)R for weaving the permeable sheet (2). The warps (1)F and (1)R are on the same level and the warps (2)F and (2)R are on the same level.

In this state, after the wefts are passed, the pulley C is rotated counterclockwise by a predetermined angle to move the heddles 6-1 etc. to a lowered position and the heddles 6-2 etc. to a lifted position as shown in FIG. 3(b). The position of the warps is now reversed and the warps (1)F and (1)R are located in a lower position than the warps (2)F and (2)R. At this time, the warps (1)F and (1)R are on the same level and the warps (2)F and (2)R are on the same level. Then, the reed 9 is operated to perform the beating up.

By repeating the above described operation by a predetermined number of times, a joint is formed between the permeable sheet (1) and the permeable sheet (2) in such a manner that the warps (1)F, (1)R, (2)F and (2)R are interwoven.

The heddles 6-5, 6-9, 6-13 etc. are on the same level as the heddle 6-1 whereas the heddles 6-6, 6-10, 6-14 etc. are on the same level as the heddle 6-2, so that the heddles on the same level perform the same operation. The heddles 6-3, 6-7, 6-11, 6-15 etc. perform the same operation as the heddle 6-1 with their eyes located lower by a half pitch than the heddle 6-2. Accordingly, a joint is likewise formed between the warps (3)F, (3)R and (4)F, (4)R by weaving the permeable sheets (3) and (4) and similar joints are formed between other adjacent permeable sheets in a similar manner.

In this manner, the joints 11b (FIG. 8) extending in the main stream in the packing 3 are simultaneously formed between the permeable sheet (1) and the permeable sheet (2), between the permeable sheet (3) and the permeable sheet (4) and between the permeable sheet (5) and the permeable sheet (6) etc. In FIG. 3, joints between the permeable sheets (1) and (2) and between the permeable sheets (3) and (4) only are shown by way of example.

Step (II)

This step is one subsequent to the above described step for weaving the joints. The non-joint portions 11a (FIG. 8) of the respective permeable sheets are woven in this step. Step (II) is shown in FIG. 4.

In this step, the pulley C is rotated by a predetermined angle to bring the pulley A to a lifted position and the pulley B to a lowered position and the pulley C is held stopped in this position. In this state, the warps (1)F, (1)R are always in a higher position than the warps (2)F, (2)R and the warps (3)F, (3)R are always in a higher position than the warps (4)F, (4)R. The pulleys A and B are respectively rotated alternately in opposite directions by a predetermined angle while the pulley C is held stationary. In the state of FIG. 4(a), the heddles of the F side such as the heddles 6-1F, 6-2F etc. are in a lifted position and the heddles of the R side such as the heddles 6-1R, 6-2R etc. are in a lowered position, so that the warp (1)F is positioned higher than the warp (1)R, the warp (2)F is positioned higher than the warp (2)R, the warp (3)F is positioned higher than the warp (3)R and the warp (4)F is positioned higher than the warp (4)R. In this state, wefts are fed between the sheds formed by the warps (1)F and (1)R, warps (2)F and (2)R, warps (3)F and (3)R and warps (4)F and (4)R respectively and thereafter the pulleys A and B are rotated in an opposite direction by a predetermined angle. This brings the heddles of the F side such as the heddles 6-1F, 6-2F to a lowered position and the heddles of the R side such as the heddles 6-1R, 6-2R etc. to a lifted position as shown in FIG. 4(b). Accordingly, the warps (1)R, (2)R, (3)R and (4)R are positioned higher than the pairing warps (1)F, (2)F, (3)F and (4)F. The reed 9 is now operated to perform the horizontal pressing and thereafter the pulleys A and B are rotated in an opposite direction to be restored to the state of FIG. 4(a). The above described operation is repeated by a predetermined number of rotations whereby the respective non-joint portions 11b of the permeable sheets (1), (2), (3) etc. are simultaneously woven.

Step (III)

This is a step in which joints 11b are formed between the permeable sheets (2) and (3), permeable sheets (4) and (5) etc.

Figure 6:
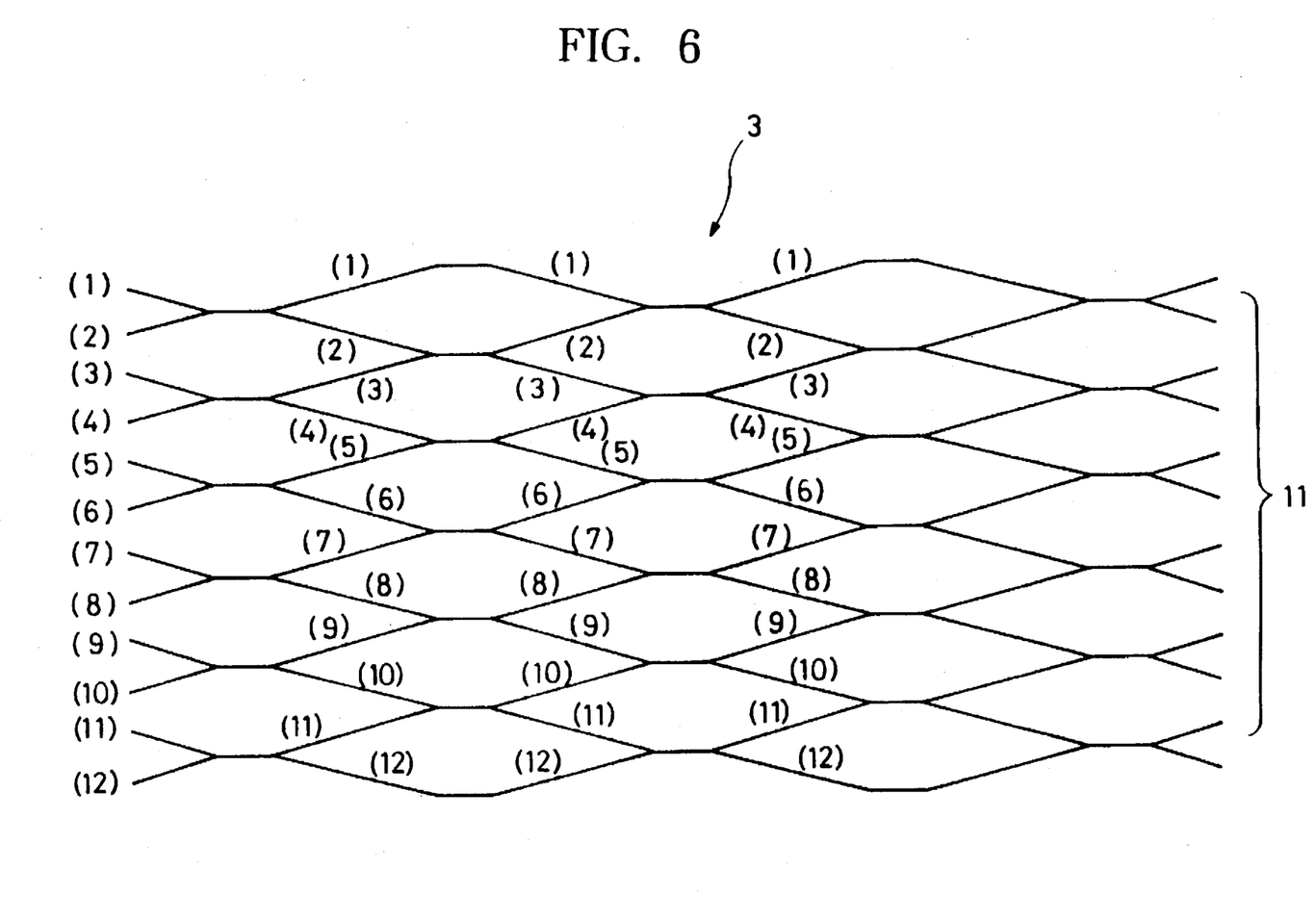
FIG. 6 is a diagram showing relationship between respective woven permeable sheets.

In this state, the pulleys A and B are not rotated but the pulley C is rotated alternately in an opposite direction by a predetermined angle between two positions in which the pulley A is always in a higher position than the pulley B. In the state of FIG. 5(a), the warps (2)F, (2)R of the heddle 6-2 are in a higher position than the warps (3)F, (3)R of the heddle 6-3 and the warps (4)F, (4)R of the heddle 6-4 are at a higher position than the warps (5)F, (5)R of the heddle 6-1. The warps (2)F and (2)R, warps (3)F and (3)R, warps (4)F and (4)R and warps (5)F and (5)R are respectively on the same level. In this state, wefts are passed and then the pulley C is rotated clockwise by a predetermined angle to bring the pulley A to an even higher position than the pulley B as shown in FIG. 5(b). In the state of FIG. 5(b), the warps (3)F and (3)R of the heddle 6-3 are moved to a higher position than the warps (2)F and (2)R of the heddle 6-2 and the warps (5)F and (5)R of the heddle 6-1 are moved to a higher position than the warps (4)F and (4)R of the heddle 6-4. The reed 9 is operated to perform the horizontal pressing and then the pulley C is rotated in an opposite direction to restore it to the state of FIG. 5(a). By repeating this operation, the joints 11b extending in the direction of the main stream in the packing 3 are woven simultaneously between the permeable sheets (2) and (3), permeable sheets (4) and (5) etc. The forming of the joints between the respective permeable sheets (1), (2), (3) etc. in steps (I), (II) and (III) is shown in FIG. 6.

Step (IV)

This step is similar to the above described step (II) so that illustration thereof will be omitted. This step is one subsequent to the joint forming between the permeable sheets (2)

and (3) etc. and non-joint portions 11a of the respective permeable sheets 11 are woven again in this step.

In this step, as in step (II), the pulleys A and B are respectively rotated alternately in opposite directions by a predetermined angle while the pulley C is held in a stopped position and the intermittently feeding of the wefts and the horizontal pressing by the reed 9 are repeated by a predetermined number of times whereby non-joint portions 11a of the permeable sheets (1), (2), (3) etc. are simultaneously woven.

Figure 8:
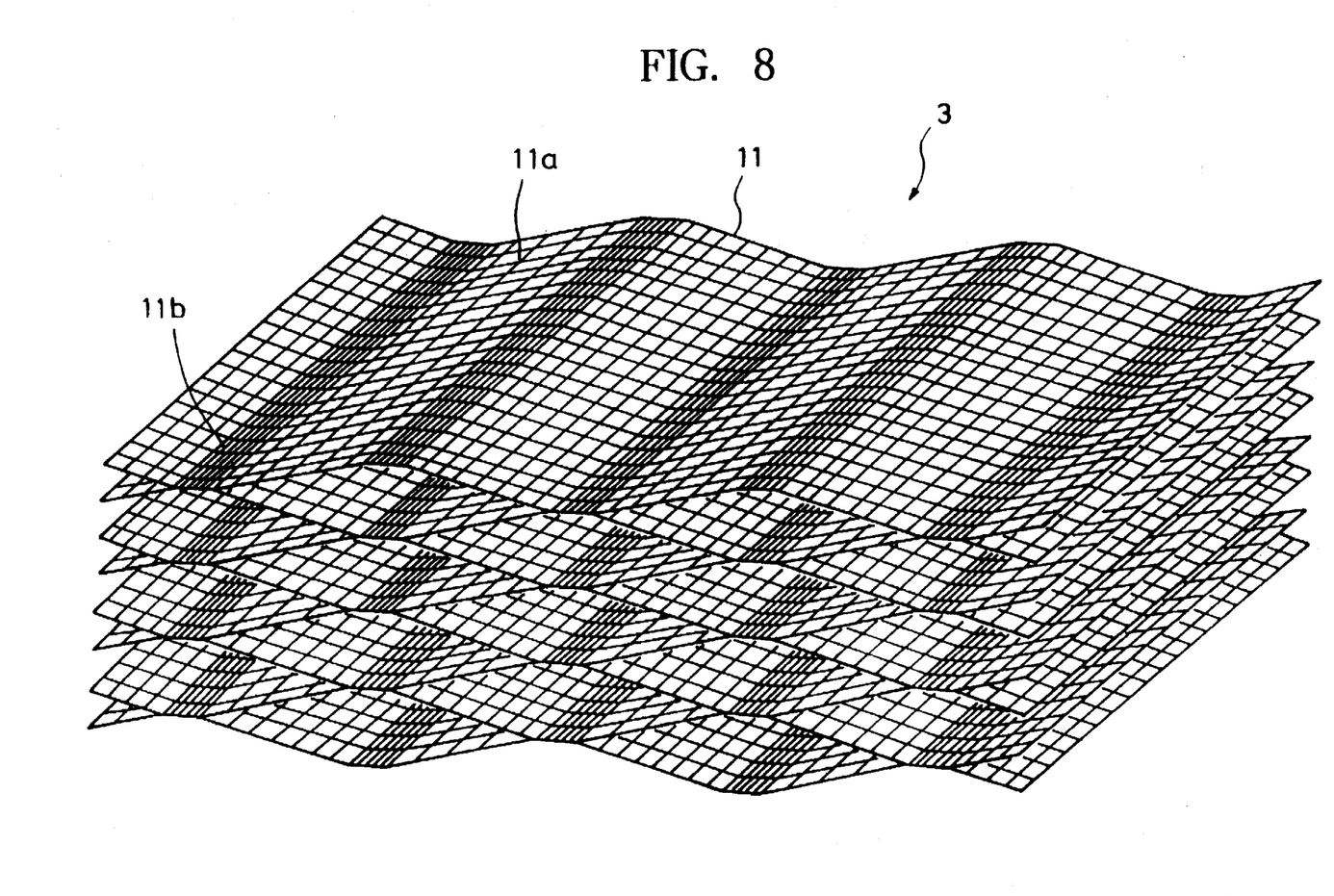
FIG. 8 is a perspective view showing a part of a completed packing.

After step (IV), the weaving process returns to step (I) and then step (II), (III) and (IV) are repeated to complete the packing 3 as shown in FIG. 8.

Figure 7:
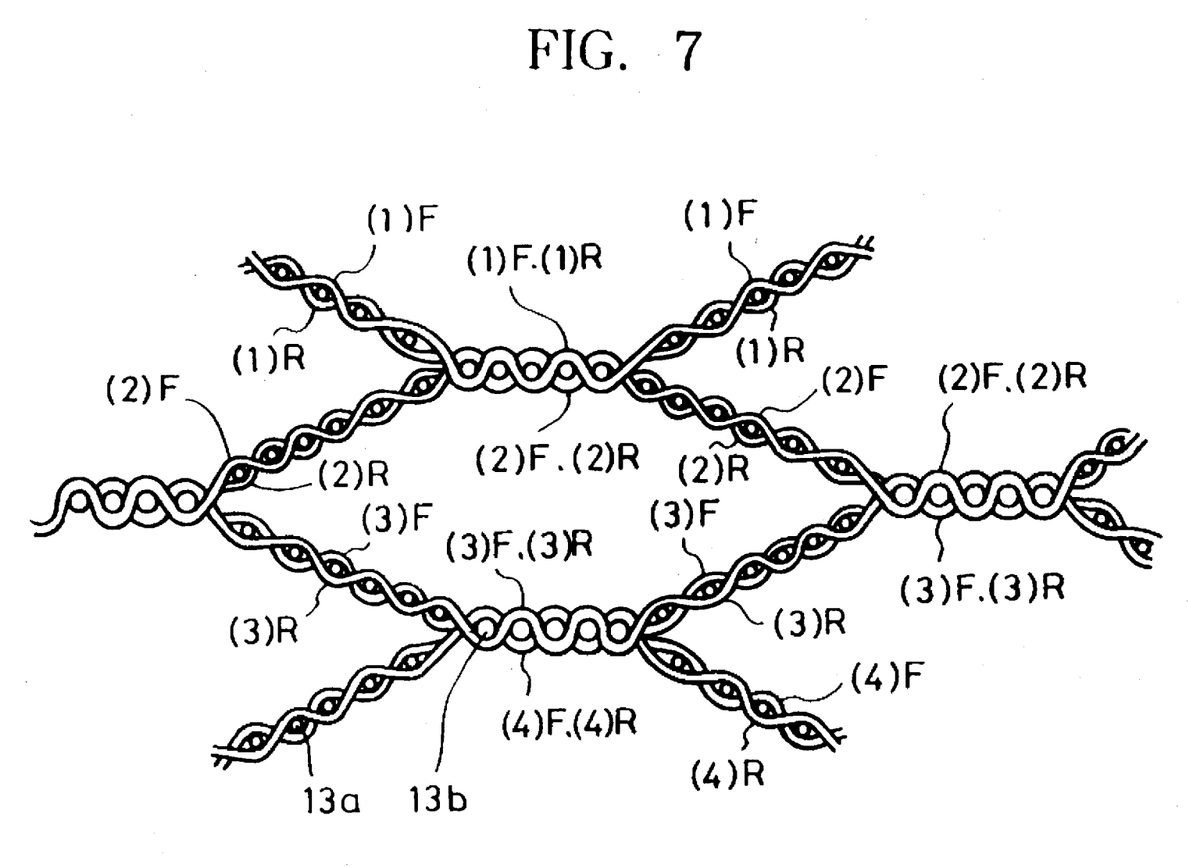
FIG. 7 is a side view showing, in an enlarged scale, a part of joints and portions other than the joints of the woven permeable sheets.

A part of the non-joint portions 11a and the joints 11b of the respective permeable sheets of the completed packing 3 is shown in an enlarged scale in FIG. 7.

In the above described embodiment, the packing 3 is formed by moving permeable sheets of plural strata in a horizontal direction. If a woven packing can be wound once on a drum and then restored to the shape of the X-packing (e.g., in a case where the packing is woven with cotton yarn), permeable sheets of plural strata may be horizontally fed and then wound on a drum.

The pitch i.e. picks per inch of the feeding of the wefts may be made variable by varying the speed of the warper 2. That is, if the feed speed is high, the feed length of the warps per unit time is large and the pitch is not dense, whereas if the feed speed is low, the feed length of the warps per unit time is small and the pitch is dense. By this arrangement, the weft feeding pitch in the joints 11b is made denser than the weft feeding pitch in the non-joint portions 11a, so that joints 11b of a low permeability is formed for the purpose of achieving uniform aggregation and distribution of liquid in the joints 11b. In weaving the non-joint portions 11a, two or more different pitches may also be employed.

As for the wefts, it is preferable to use two types of wefts, one for the non-joint portions 11a and the other for the joints 11b for the purpose of achieving a low permeability in the joints 11b. For example, as shown in FIG. 7, wefts 13b used for the joints 11b are of a larger diameter than wefts 13a used for the non-joint portions 11a.

In the above described embodiment, the joints are woven in such a manner that they extend in the direction of the main stream of the packing. This shape of the joints is preferable for effectively performing aggregation, retention and redistribution of liquid. The shape of the joints however is not limited to this but, for example, joints may be formed by line contact of adjacent permeable sheets.

In the above-described embodiment, four types of heddles are operated as one set. The invention is not limited to this because one set of heddles may be composed of a larger number of heddles. The pulleys are not limited to three pulleys as in the above described embodiment because more pulleys may be used in combination if desired. The same operation as the one performed by the pulleys may be performed by using a mechanism for vertically moving heddles or combination of heddles separately instead of using the pulleys.

What is claimed is:

1. A method for manufacturing a packing used in a device having an internal structure divided in a plurality of chambers or channels connected to one another to allow the passage of a main stream of fluid, said packing forming said internal structure and having undulating permeable sheets disposed in parallel to one another to form plural channels and extending substantially in the direction of a main stream of fluid, and having projecting portions of respective undulating permeable sheets being disposed in a direction crossing the direction of the main stream and joints being formed in selected portions between adjacent permeable sheets in the projecting portion wherein the improvement comprises forming said undulating permeable sheets of plural channels and said joints between the adjacent permeable sheets by simultaneously weaving a plurality of channels to manufacture a woven packing having plural channels and feeding wefts into sheds of paired warp sheets with a denser pitch into the joints than the wefts in the portions other than the joints.

2. A method as defined in claim 1 wherein said joints between the adjacent permeable sheets are formed by the steps of:

(a) weaving a joint between a first permeable sheet and a second permeable sheet adjacent to the first permeable sheet among the permeable sheets of plural channels forming said packing, and weaving a joint between a third permeable sheet adjacent to the second permeable sheet on the opposite side of the first permeable sheet and a fourth permeable sheet adjacent to the third permeable sheet on the opposite side of the second permeable sheet, (b) weaving portions other than the joints of the respective permeable sheets, (c) weaving a joint between the second permeable sheet and the third permeable sheet, and (d) weaving portions other than the joints of the respective permeable sheets.

3. A method as defined in claim 2 wherein in the weaving process, the warp sheds of said permeable sheets are made by operating heddles having plural eyes for passing warps formed in multiple stages therethrough in correspondence to the number of respective permeable sheets.

4. A method as defined in claim 2 wherein in the weaving process, the feeding of wefts to weave the joint and the portion other than the joint of the permeable sheets is made by a shuttle having weft supply means arranged in plural stages and which is capable of feeding wefts corresponding in number to the number of the permeable sheets forming the packing.

5. A method as defined in claim 2 wherein, pressing of the joints and the portions other than the joints, by a reed means having an opening through which the respective warps pass in multiple stages occurs during weaving.

6. A method for manufacturing a multi-stratum structure selected from the group consisting of a mist eliminator, a multi-stratum filter membrane, multi-stratum cloth and multi-layered aggregate, comprising the steps of simultaneously weaving adjacent undulating permeable sheets and joining said sheets together in selected portions simultaneously by joints to form a woven multi-layered structure and feeding wefts of denser pitch into the joints versus the wefts pitch used in the portions of said multi-stratum structure.

* * * * *